United States Patent Office 3,214,115
Patented Oct. 26, 1965

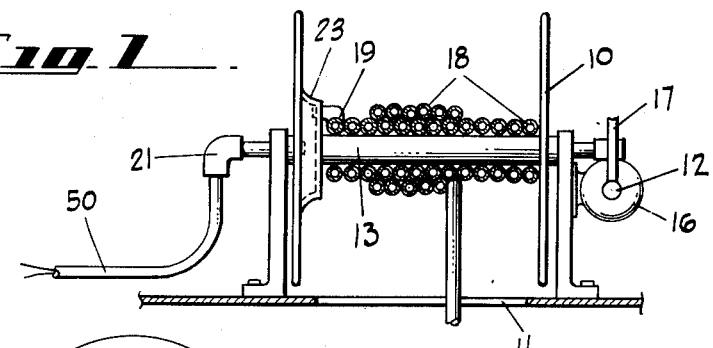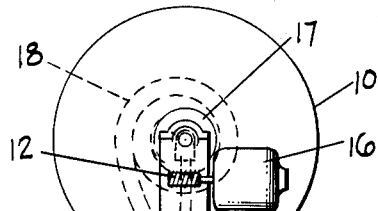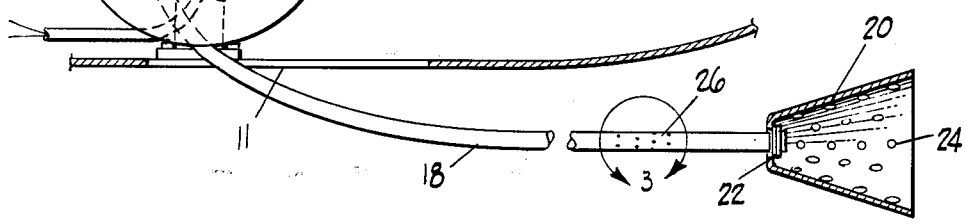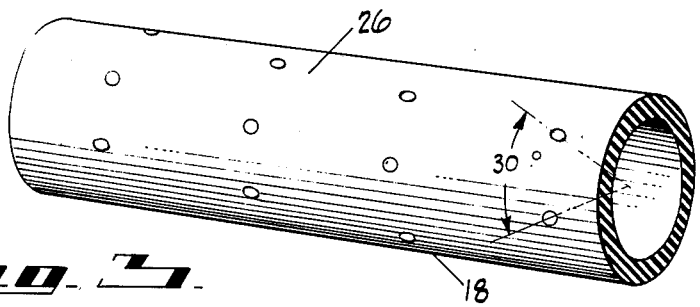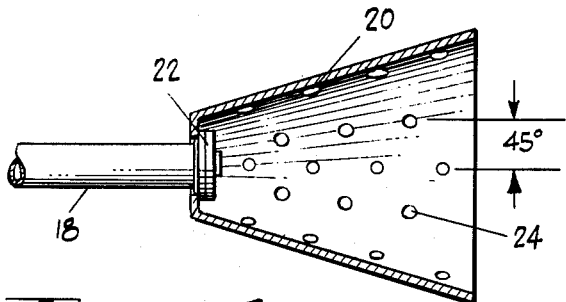

3,214,115
TRAILING STATIC SOURCE FOR AIRSPEED CALIBRATION
Eldon N. Price, Malibu, Calif., assignor to Douglas Aircraft Company, Inc., Santa Monica, Calif.
Filed Apr. 4, 1961, Ser. No. 100,616
5 Claims. (Cl. 244—1)

This invention relates to devices for sensing static atmospheric pressures in aircraft for the purpose of calibrating any system in the craft that employs static pressures as a reference parameter.

The present device can hence well be used for calibrating airspeed indicators, altimeters, mach number indicators, vertical-speed indicators, engine-duct pressures, air-conditioning duct pressures, autopilots and for calibrating surveys of airframe pressure points.

Ordinarily, the free-air static pressure pickup device on an aircraft is located on a boom extending forwardly of the wing or nose; or consists of an ordinary finned bomb-casing or the like heavy object with pickup orifices in the "bomb" casing, the whole being trailed aft of the craft by an ordinary cable. Separate leads run from the "bomb" to the calibration region.

In the boom form, the boom must be of a length equal to about eight times the fuselage's maximum diameter in order to place the pickup apertures in undisturbed air far forward of the craft and also in order to eliminate the interference effect of the airframe upon the pickup. Usually, this would render the boom at least 80 feet long, for most aircraft, especially high speed ones. Because of the substantial flexure and instability of a boom of this length that is not prohibitively heavy and for other reasons, boom-type pickup arrangements are impracticable for calibration purposes in high speed aircraft.

In the bomb type of pickup arrangement the casing is aerodynamically unstable and undesirably tilts up and down on its cable about its transverse axis at any substantial speed, thus rendering the pickup quite inaccurate. The bomb casing and contents are usually, of necessity, rather heavy and the cable-trailed bomb is prone to droop far below the aircraft and strike obstacles on take-off and landing and has even been known to strike the accompanying "chase" aircraft. Because of the high drag of the cable or conductor and the bomb's vertical and horizontal instability and also because of the weight penalty imposed by the usually heavy "bomb," the "bomb" type device is quite likely to pull apart and separate from its cable. Additionally, bomb-casings have very substantial lateral dimensions producing disturbed airflow over their surfaces so that static openings in their side walls are not subjected to the true static pressure of the ambient atmosphere and cannot give a true reading.

The present invention overcomes these, and other deficiencies in the state of the art by providing a static pressure pickup arrangement and construction which partakes of the nature of neither of the aforesaid prior types of devices. The invention is embodied in a flexible and reelable small diameter conductor, tube, or conduit of metal or other suitable material which is terminated at its rear end by a drogue-member of improved characteristics and which flexible metal tube or conduit is unreelably wound at its forward portion on a reel inside or attached to the enclosure, such as a fuselage. Intermediate the drogue and the reel and located on the tube ahead of the drogue a distance of about six to eight times the largest diameter of the drogue are a series of static pickup apertures. The reel has a hollow axle and the flexible tube has its front end attached to the one end of the hollow axle of the reel, while either end of the axle is swivelledly attached to the rear end of a conduit leading to the calibration station in the airplane. The drogue is preferably entirely hollow and light and of frusto-conical shape and is normally housed sub-adjacent the fuselage with the hose reeled in, but at an airspeed of the order of approximately 200 knots, the drogue becomes active and can itself unwind the perforate tube to an aft-trailing position, although it is preferred to unreel the tube by power-means. In either event, it tensions the tube and constrains the tube to lie closely adjacent the fuselage at its front end.

The cone is rendered stable by means of orifices so shaped and located therein as to destroy laminar flow around the cone, thus to obviate air-pressure imbalance therein, as well as to compensate for manufacturing deviations in the shape of the cone from that of a geometrically regular frusto-cone. It follows that he cone moves neither up and down nor sidewise during flight, so that it introduces no inaccuracies in the pickup. Nor can any unbalanced force occur that would tend to separate the cone bodily from the tube. Lying close to the aerodynamic envelope of the ship, it does not droop and strike obstacles in take-off, flight, or landing.

One of the presently preferred embodiments of the invention is representationally illustrated in the accompanying drawings and described hereinafter solely to render the inventive concepts more concrete.

In these drawings:

FIG. 1 is a fragmentary view taken transversely of an airplane to show the reel and hose in elevation;

FIG. 2 is a view taken longitudinally of a portion of an airplane fuselage, showing the reel in end view, and showing the flexible metallic hose and drogue in side view;

FIG. 3 is a fragmentary perspective view of that portion of the hose which includes the pickup orifices, showing the preferred pattern of arrangement of these orifices around the cylindric surface of the hose, and FIG. 4 is a fragmentary sectional view of the aft end of the device, showing the pattern of arrangement of the stabilizing orifices in the drogue "cone."

It should be noted at the outset that the construction, arrangement and functioning of the device is strictly in conformity to Bernoulli's theorem of fluid flow in a "stream-tube," such as is the metallic flexible hose, 18. This theorem may be stated as follows, assuming steady adiabatic-flow:

$$\frac{V_1^2}{2}+\frac{r}{r-1}\times\frac{P_1}{C_1}=\frac{V_2^2}{2}+\frac{r}{r-1}\times\frac{P_2}{C_2}$$

wherein $V_1$ and $V_2$ represent free stream velocities at two points, "1" and "2" in the horse; $r$ is the ratio of specific heat for air; $C_1$ and $C_2$ represent the air densities at the same points, "1" and "2"; and $P_1$, $P_2$ represent static atmosphere pressures at points "1" and "2."

As shown in FIG. 2, the present pickup device although not a boom since it is (1) flexible and reelable, and (2) bears pickup orifices and drogue means at its rear portion, does extend from the craft well into free air, and can well have a length up to the order of 150 feet, in a typical case, counting from the exit aperture 11 for the tube or conduit 18 in the fuselage or other enclosure carried by the airplane. This will place the static apertures at a distance of the order of one to one and one half fuselage lengths behind the aircraft so that the reading can be taken at a point substantially undisturbed by the passage of the aircraft through the air. In addition, because of the small diameter of the tube, of the order of one-eighth inch, and its great length, the tube itself does not disturb the air surrounding it sufficiently to destroy accurate readings of pressure such as occurs with the bomb or boom type devices.

Although this tube or conduit 18 does include pickup apertures, a mere perforate tube, per se, is not contemplated by the invention. For one reason, such tube would be impracticable because of the inherent instability thereof arising from fluctuating drag and Reynolds-number phenomena. Such instability would eventually result in "kinking" of the tube, as well as in vertical and horizontal oscillations thereof, both occurrences destroying the accuracy of pickup.

In order to obviate these detrimental occurrences, as well as to automatically unreel the tube, when such is desired, this invention provides improved stable and stabilizing drogue means 20 for tensioning the trailing tube and maintaining the tube rectilinear and in equilibrium close to the fuselage.

More specifically, referring to the parts and combinations shown in the drawings and commencing with the forward region of the device, a substantially conventional hose-reel 10 is mounted in the interior of the fuselage or other enclosure over an exit opening 11 therein, shown in exaggerated scale. The reel can be operated by the aft pull of the exposed drogue, if desired, but it is preferred to unreel the hose 18 by any suitable powered means, such as a small electric motor 16. The motor 16 here drives a worm gear 12 which, in turn, drives a worm wheel 17 fixed to the hollow axle 13 of the reel. The inner end 19 of the tube 18 is fixed to one end portion of the hollow axle 13 and communicates therewith by way of the hollow boss or plenum chamber 23. The hollow axle communicates static pressure pickup to the calibration region of the craft by means of a conventional tube-swivel 21 and a lead-tube 50.

The rear end of the trailing portion of the pickup tube 18 may lie some 150 feet behind the reel, and to its rearmost end 22 is swivelled a drogue frusto-cone 20.

In the rear portion of tube 18 and located some six to eight cone-diameters ahead of the cone are a plurality of pickup orifices 26. These orifices, as shown in FIG. 3, are distributed around the cylindric surface of the tube in a pattern made up of several groups of four orifices per group, and the groups are longitudinally staggered with respect to the axis of the tube. The adjacent groups are angularly spaced 30° apart from each other. In each group, the orifices are preferably spaced two inches apart longitudinally, and each orifice is made with a #70 twist drill, in a .140 O.D. steel tubing, to be specific.

The drogue 20 is substantially frusto-conical in shape, is hollow and is swivelled at 22 to the dead ended tube entering the drogue. Member 22 is an antifriction thrust bearing, the rear portion of which is attached to tube 18 and the forward portion of which is attached to the cone 20.

In order to stabilize the cone and tube, as above mentioned, a plurality of orifices 24 are provided therein. These orifices are distributed around the conical surface of the drogue in alternating groups of three and four orifices each. The apertures 24 are preferably one inch in diameter in a twelve inch long cone, and are longitudinally spaced apart three inches on 45° semi-quadrantal center lines. Thus, laminar, unbalancing flow cannot occur on the drogue.

The manipulation and functioning of the device are apparent from the foregoing description, but it should be stated that because of the light weight and equilibrium of the cone, it is highly unlikely that it will be torn off the tube and fall, so that habitated areas are in no danger from this device. Because of the substantial tension set up in the small diameter tube by the light weight cone, the device is not likely to "droop" sufficiently to collide with obstacles on the ground or in the air. In fact, it trails almost exactly in the flight path of the aircraft.

The device is inherently capable of use on any type of airplane and functions accurately at all speeds.

Because of the novel geometry, location, and construction of the device accurate static pressure pick-ups, in a free stream, can be made at speeds well above Mach 1.

It will be perceived that there are substantially no moving parts in the device itself to get out of order, and the reeling mechanism is of established conventional nature.

In addition to its being insensitive to altitude changes of its carrying craft, no part of the device itself requires calibration.

Although certain specific shapes, dimensions, etc. have been set forth hereinabove, the invention itself is not limited in its scope thereby, being of the nature and ambit defined in the sub-joined claims.

I claim:

1. In an airplane including an enclosure, means for sensing and forwarding static free-airstream pressures, comprising: flexible conduit carried by the enclosure, said enclosure including an aperture therein through which said conduit is rearwardly extendable to trail aft of the airplane so as to place its rear portion in the free airstream; static air pressure pickup means in said conduit; and aerodynamically stable drogue means carried by and swivelledly attached to the rear end portion of said conduit in a conduit-tensioning and stabilizing location rearwardly of said rear end portion, said drogue being light and hollow and having a generally frusto-conical shape with the smaller end forward, said drogue including apertures distributed and arranged thereon in locations around its periphery mutually arranged to effect inhibition of laminar airstream flow on said drogue, and to compensate for manufacturing deviations in its shape from a geometrically regular frusto-cone, thereby to obviate oscillation of said drogue and maintain it stably in the desired position, said pickup means being located a distance forward of said drogue of the order of six to eight times the largest diameter of said drogue.

2. A device according to claim 1, in which the static air pressure pickup means are apertures distributed around the cylindric surface of the tube in a pattern made up of a plurality of groups of four apertures per group, the groups being longitudinally staggered with respect to the axis of the tubes.

3. A device according to claim 1, in which the static air pressure pickup means are apertures distributed around the cylindric surface of the tube in a pattern made up of a plurality of groups of four apertures per group, the groups being longitudinally staggered with respect to the axis of the tubes; the adjacent groups of apertures being angularly spaced apart of the order of 30°.

4. A device according to claim 1, in which the outside diameter of said conduit is of the order of one eighth inch to one quarter inch and said static air pressure pickup means is near the rear end of said conduit.

5. An aircraft trailing static pressure sensing device comprising:
   a flexible conduit carried by an aircraft;
   drogue means carried by the rear end portion of said conduit in a conduit-tensioning and stabilizing location rearwardly of said rear end portion,
   said drogue means having a generally frusto-conical configuration;
   said conduit having apertures therein a distance forwardly from said drogue means on the order of 6 to 8 times the largest diameter of said drogue;
   said conduit having a length forwardly of said apertures sufficient to place said apertures rearwardly of said aircraft at a point substantially undisturbed by the passage of said aircraft through the air.

References Cited by the Examiner

UNITED STATES PATENTS

| | | | |
|---|---|---|---|
| 2,303,713 | 12/42 | Thompson | 244—113 |
| 2,344,945 | 3/44 | Knox et al. | 244—113 X |
| 2,381,957 | 8/45 | Ibarra | 244—113 |
| 2,693,700 | 11/54 | Osborne | 73—182 |
| 2,774,547 | 12/56 | Latimer-Needham et al. | 244—135 |

FERGUS S. MIDDLETON, *Primary Examiner.*